United States Patent
Louise et al.

(10) Patent No.: US 8,973,009 B2
(45) Date of Patent: Mar. 3, 2015

(54) ALLOCATION AND CONTROL UNIT FOR CONTROLLING PARALLEL EXECUTION OF THREADS ON AUXILIARY PROCESSING UNITS

(75) Inventors: Stéphane Louise, Orsay (FR); Vincent David, Marcoussis (FR); Raphael David, Bures sur Yvette (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 211 days.

(21) Appl. No.: 13/202,945

(22) PCT Filed: Feb. 22, 2010

(86) PCT No.: PCT/EP2010/052215
§ 371 (c)(1),
(2), (4) Date: Aug. 26, 2011

(87) PCT Pub. No.: WO2010/105889
PCT Pub. Date: Sep. 23, 2010

(65) Prior Publication Data
US 2011/0314478 A1 Dec. 22, 2011

(30) Foreign Application Priority Data
Feb. 24, 2009 (FR) ...................................... 09 00833

(51) Int. Cl.
*G06F 9/46* (2006.01)
*G06F 9/50* (2006.01)
(Continued)

(52) U.S. Cl.
CPC ............ *G06F 9/5066* (2013.01); *G06F 9/3851* (2013.01); *G06F 9/52* (2013.01); *G06F 9/30101* (2013.01); *G06F 9/3836* (2013.01); *G06F 9/3877* (2013.01)
USPC ........................................................ 718/104

(58) Field of Classification Search
CPC ........ G06F 9/3836; G06F 9/3877; G06F 9/52
See application file for complete search history.

(56) References Cited

U.S. PATENT DOCUMENTS 5,909,565 A * 6/1999 Morikawa et al. ............ 712/200
6,249,858 B1 6/2001 Hayakawa et al.
(Continued)

FOREIGN PATENT DOCUMENTS

WO 2007/051935 A1 5/2007

OTHER PUBLICATIONS

"Virtual Topologies: A New Concurrency Abstraction for High-Level Parallel Languages" by Philbin, J. et al.; Computer Science Division, NEC Research Institute; Department of Computer Science, Yale University; pp. 450-464; XP000689164; ISBN: 978-3-540-60765-6.

*Primary Examiner* — Meng An
*Assistant Examiner* — James J Lee
(74) *Attorney, Agent, or Firm* — Baker & Hostetler LLP (57) ABSTRACT

An allocation and control unit for allocating execution threads for a task to a plurality of auxiliary processing units and for controlling the parallel execution of said execution threads by said auxiliary processing units, the task being executed in a sequential manner by a main processing unit. The allocation and control unit includes means for managing auxiliary logical processing units, means for managing auxiliary physical processing units each corresponding to an auxiliary processing unit, and means for managing the auxiliary processing units. The means for managing the auxiliary processing units include means for allocating an auxiliary logical processing unit to an execution thread to be executed, and means for managing the correspondence between the auxiliary logical processing units and the auxiliary physical processing units. The auxiliary processing units execute in parallel the execution threads for the task by way of the auxiliary logical processing units, which are allocated as late as possible and freed as early as possible.

12 Claims, 3 Drawing Sheets

(51) Int. Cl.
*G06F 9/38* (2006.01)
*G06F 9/52* (2006.01)
*G06F 9/30* (2006.01)

(56) References Cited

U.S. PATENT DOCUMENTS

| | | | |
|---|---|---|---|
| 6,883,085 B2 * | 4/2005 | Deveruex ................... 712/34 |
| 6,987,517 B1 | 1/2006 | Donovan et al. |
| 7,287,255 B2 * | 10/2007 | Potter, Jr. ....................... 718/102 |
| 2002/0013872 A1 * | 1/2002 | Yamada ........................ 710/240 |
| 2002/0049894 A1 * | 4/2002 | Moyer et al. .................... 712/34 |
| 2006/0101245 A1 * | 5/2006 | Nair et al. ...................... 712/221 |
| 2006/0130062 A1 * | 6/2006 | Burdick et al. ............... 718/100 |
| 2008/0098398 A1 * | 4/2008 | Heijligers et al. ............ 718/103 |
| 2008/0140989 A1 | 6/2008 | Dudau et al. |
| 2009/0204959 A1 * | 8/2009 | Anand et al. ...................... 718/1 |

* cited by examiner

ALLOCATION AND CONTROL UNIT FOR CONTROLLING PARALLEL EXECUTION OF THREADS ON AUXILIARY PROCESSING UNITS

CROSS-REFERENCE TO RELATED APPLICATIONS

This application is a National Stage of International patent application PCT/EP2010/052215, filed on Feb. 22, 2010, which claims priority to foreign French patent application No. FR 09 00833, filed on Feb. 24, 2009, the disclosures of which are incorporated by reference in their entirety.

FIELD OF THE INVENTION

The present invention relates to an allocation and control unit for allocating execution threads for a task to a plurality of auxiliary processing units and for controlling the parallel execution of said execution threads by said auxiliary processing units, the task being executed in a sequential manner by a main processing unit. It applies notably in the field of embedded systems with high computational power.

BACKGROUND OF THE INVENTION

The limits of superscalar processors are no longer technological: they are the limits of the microparallelism of instructions. Indeed, data dependencies form an insuperable barrier within the framework of execution wherein the tasks are started in order and are terminated in order. The more that intermediate execution out of order is permitted, the more necessary it is to put in place significant dependency computation logic. On the other hand, the mean number of instructions executed per cycle (mean IPC) progresses fairly little when the instruction window is increased beyond what is currently practiced.

Therefore, the architecture of computation systems is currently undergoing significant alterations. Indeed, even though at the present time there is no fundamental doubting of the famous "Moore's Law", which predicts the exponential growth of the number of transistors that can be implemented on a silicon chip at a given instant, the semiconductor industry nonetheless faces an admission of failure: there are no longer any credible routes to significantly increase the performance of individual processors.

It is nonetheless known from the basic work in the subject, in the 1960s, that the ratio of the computational power to the efficiency of computation systems is potentially much higher for parallel systems than for sequential processors. This is why, at all levels, on-chip parallel systems are increasingly being deployed. In theory they allow more efficient use of the additional transistors that can be integrated on one and the same chip, on account of the progress made in etching techniques.

Now, although it has been known for a long time that parallel systems are more efficient than conventional sequential systems, one could wonder why this has not become commonplace sooner, especially in the field of embedded systems, which is basically heavily centered on the optimization of the various efficiencies. But on the one hand, the technology did not allow the integration of massively parallel structures on one and the same component, with the exception of the easily programmable SIMD ("Single Instruction, Multiple Data") structures. Moreover, parallel systems are much more difficult to program and to develop in a general manner, especially symmetric systems based on the replication of the same processing element and possessing identical and homogeneous access and communication interfaces.

In the field of embedded systems, notably that of mobile telephony, "multicores" on a single chip have appeared, which may contain DSPs ("Digital Signal Processors") for signal processing, GPPs ("General Purpose Processors") for ordinary processing, as well as analog input/output blocks. In the field of personal stereos or multimedia players, decoding cores dedicated to audio ("MPEG Audio Layer", "Dolby D", "DTS") or to video ("MPEG", "H264") have appeared in addition to the general-purpose processor.

Thus, the prior art now includes models of interaction between a general-purpose processor and coprocessors or, more generically, between a main processor and auxiliary processing units. For example, units for accelerating processing, in particular for mathematical computations, have existed since the 1970s. In a certain number of cases, these units, dubbed "coprocessors", are distinct from the so-called "main" processor. This was the case with the processors for micro-computers and work stations until the end of the 1980s. But it is still the case for embedded systems, whether it be in order to increase parallelism by potential decoupling of the two units, or whether it be to reduce costs. Indeed, a low-cost generic processor is then employed in conjunction with a separate specific processing unit generally designed "in house", as is the case for the "Fire" vector coprocessor from Thomson.

For example, U.S. Pat. No. 6,249,858 shows one of the most recent aspects relating to the capabilities for coupling between a standard processor and a coprocessor, by allowing parallel execution of the processing activities on the two entities. The coupling is fairly tight: the main processor dispatches the computation commands to the coprocessor by providing operands and a program address in ROM. However, this requires dedicated support software, since an interrupt must be taken on the main processor to appropriately manage the call to the functionalities of the coprocessor, and another interrupt is generated by the coprocessor at the end of the computation. It thus shows how to weakly couple the main processor and its computation accelerator. Nonetheless the scheme is not generalizable to a plurality of acceleration elements. Moreover, it does not make it possible to dispense with a system support for control and for obtaining the results of the computations of the coprocessor. Neither does it make it possible to easily ensure consistency in the dependencies of computations. The latter are a priori the remit of the programmer, this generally being difficult on a parallel system where the processing activities may be strongly heterogeneous. This also renders scale-up extremely difficult and reserved for specialists in parallel programming.

Another example, the GPUs (Graphics Processing Units) of modern graphics cards described in U.S. Pat. No. 6,987,517 may be considered to be sets of auxiliary units specialized for single program, multiple data (SPMD) vector computation. In this case, there is a weak coupling between this multitude of units and the control processor, since the problem processed is massively parallel. Indeed, one and the same processing has to be performed on sets of distinct data, to compute pixels in a memory buffer. But it is not significant that there is an error at a given moment since, because the error rate remains low, the user is not inconvenienced. Moreover, there are no means of simply accessible synchronization, as the problem is intrinsically parallel. The only significant synchronization occurs at the end of the processing of an image, so as to add post-processing stages or simply to display on the screen the computed pixels.

Another example, the American patent application published under the number US2008140989 (A1) describes methods for distributing processing activities over auxiliary units. But the methods described in this patent application do not offer any simple means for managing parallelism at several levels automatically. Notably they do not allow coexistence of parallelism at the level of the tasks on the main processor, termed "coarsegrain" parallelism, and parallelism at the level of the "threads" on the auxiliary processors, termed "fine-grained" parallelism. Moreover, the management of the determinism of execution relies on management of the parallelism by the programmer, this generally being difficult for typical applications of embedded systems.

Generally, during the execution of a task, the aforementioned solutions of the prior art afford little autonomy in the management of the auxiliary processing units, the system software often having to intervene for the execution of the task. On the contrary, if a task is disabled, these solutions of the prior art do not permit the implementation of the system software for task switching, consequently limiting the use of the various parallelisms. Consequently, they confer only a global determinism of execution that is very far from that conferred by a conventional Von Neumann architecture.

Thus, it is clearly apparent that the architects of computation systems are in a relative technological impasse between a single-processor paradigm, which is showing its limits, and on-chip multiprocessors, better known by the acronym "MPSoC" standing for "MultiProcessor System on Chip" or by the acronym "CMP" standing for "Chip MultiProcessing", which are difficult to program. Most current architectures utilize either parallelism of tasks termed "processing parallelism", or parallelism of instructions termed "instruction micro-parallelism", or else a combination of the two for MPSoCs.

Parallelism of processing activities is the parallelism of applications or tasks. Although some development systems make it possible to program such systems at the application level, it is difficult to use more than about ten processors for a standard application. It is of course possible to envisage a multi-application framework, but the problem then remains of effectively managing execution beyond 8 or 16 processors in the SMP ("Symmetric MultiProcessing") configuration. Moreover, the ordinary applications require a rewrite and a partial redesign to exploit this, such as for example the implementation of "execution threads", with the POSIX ("Portable Operating System Interface") standard.

Micro-parallelism of instructions is that which is used in superscalar processors to execute more than one instruction per cycle. But as explained above, the limits of this technology in terms of efficiency are being reached.

The limitations mentioned above may lead to the exploration of a new level of intermediate parallelism, which could be called "mesoparallelism" or "medium-grained" parallelism. This would entail intermediate parallelism between processing parallelism and instruction micro-parallelism. Various computation units would still cooperate to execute code sequences of one and the same task in parallel. But this time, the main program and the synchronization problems would be implemented on a control processor, whereas the sections of intensive computations would be implemented on specialized processors.

But implementing such mesoparallelism is not devoid of numerous difficulties. Since on the one hand, to overcome the limitations of instruction micro-parallelism, it is necessary to circumvent as far as possible execution of the program in order. Whereas on the other hand, it is necessary that the application code be as close as possible to a code of sequential type known to the programmer.

SUMMARY OF THE INVENTION

Relying on an architecture forming the subject of French patent number FR2893156 (B1) owned by the applicant, the aim of the present invention is notably to alleviate the aforementioned drawbacks, by utilizing synchronization points put in place during compilation and by using as far as possible the resources made available by the hardware and by the basic system software. For this purpose, the subject of the invention is an allocation and control unit for allocating execution threads for a task to a plurality of auxiliary processing units and for controlling the parallel execution of said execution threads by said auxiliary processing units, the task being executed in a sequential manner by a main processing unit. The allocation and control unit according to the invention comprises means for managing auxiliary logical processing units, means for managing auxiliary physical processing units, each auxiliary physical processing unit corresponding to an auxiliary processing unit and means for managing the auxiliary processing units. The means for managing the auxiliary processing units comprise means for allocating an auxiliary logical processing unit to an execution thread to be executed and means for managing the correspondence between the auxiliary logical processing units and the auxiliary physical processing units. Thus, the auxiliary processing units execute the execution threads for the task in parallel by way of the auxiliary logical processing units, which are allocated as late as possible and freed as early as possible.

In a preferential embodiment, the unit can comprise means for executing instructions inserted into the task, these instructions providing directives for managing the execution threads executable by the auxiliary logical processing units. These inserted instructions can include an instruction making it possible to allocate a given auxiliary logical processing unit to the task. These inserted instructions can also include an instruction making it possible to execute an execution thread for the task on the given auxiliary logical processing unit. This instruction then takes as input parameters a context of execution on the given auxiliary logical processing unit. The context of execution makes it possible to identify the execution thread to be executed, the input data for executing it and the output data.

In a preferential embodiment, the instruction making it possible to execute an execution thread for the task on the given auxiliary logical processing unit may be executed either with freeing request, or with synchronization request. With freeing request, the given auxiliary logical processing unit is freed as soon as the execution of the execution thread has terminated. With synchronization request, the given auxiliary logical processing unit is not freed as long as a synchronization instruction is not encountered in the flow of instructions of the task, a synchronization instruction encountered in the flow of instructions of the task making it possible advantageously to free all or some of the auxiliary logical processing units that have formed the subject of a synchronization request by the task. For example, the means for executing the instructions inserted into the task, these instructions providing directives for managing the execution threads executable by the auxiliary logical processing units, may be implemented in the form of an execution pipeline or of a microprogrammed sequencer.

In a preferential embodiment, the means for managing auxiliary logical processing units can comprise means for providing a free auxiliary logical processing unit identifier and/or means for freeing an auxiliary logical processing unit and/or means for associating an auxiliary logical processing unit with an auxiliary physical processing unit.

For example, the means for providing an auxiliary logical processing unit identifier can provide the identifier of the first element of a list of free auxiliary logical processing units.

In a preferential embodiment, the means for managing auxiliary physical processing units can comprise means for providing a free auxiliary physical processing unit identifier, and/or means for associating an auxiliary physical processing unit with an auxiliary logical processing unit, and/or means for providing the identifier of the auxiliary logical processing unit associated with an auxiliary physical processing unit, and/or means for freeing an auxiliary physical processing unit.

In a preferential embodiment, the means for allocating an auxiliary logical processing unit to an execution thread to be executed can comprise means for searching for a free auxiliary logical processing unit, and/or means for allocating the free logical processing unit to an execution thread, and/or means for providing the identifier of the auxiliary logical processing unit allocated to an execution thread.

In a preferential embodiment, the unit can comprise means for managing contexts of execution on the auxiliary logical processing units, and/or means for decoding interrupts coming from the auxiliary processing units.

In a preferential embodiment, the unit can comprise means for managing contexts of execution on the main processing unit, a context of execution on the main processing unit making it possible to identify a task executable by the main processing unit, the input data for executing it and the output data, so that several tasks may be executed on the main processing unit.

In a preferential embodiment, the unit can comprise a bank of local registers including a register for masking the exceptions and/or interrupts coming from the auxiliary processing units, and/or a register indicating the auxiliary physical processing units undergoing execution, and/or a register indicating the auxiliary logical processing units undergoing execution, and/or a register indicating the auxiliary logical processing units that have not formed the subject of a synchronization request by the task.

The main advantages of the invention are furthermore that it does not require any partial preemption of the auxiliary processing units. Moreover, the invention does not require strong synchronization of all the processing units, only weak synchronization at the level of the auxiliary processing units, optionally even synchronization by groups of auxiliary processing units. The invention also makes it possible to free the system software from the management of part of the interrupts.

BRIEF DESCRIPTION OF THE DRAWINGS

Other characteristics and advantages of the invention will become apparent with the aid of the description which follows given in relation to appended drawings which represent.

DETAILED DESCRIPTION

Figure 1:
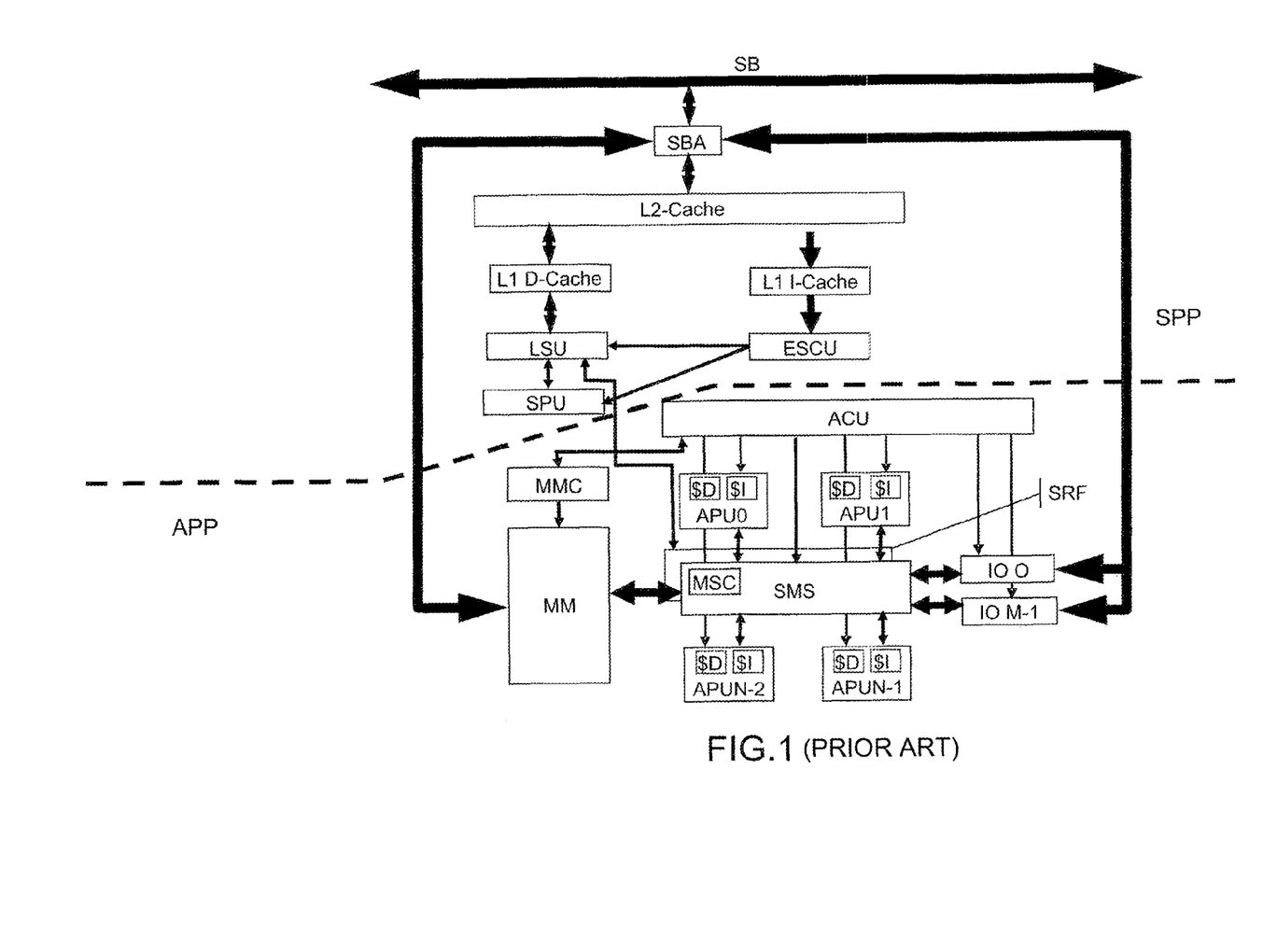
FIG. 1, by a diagram, an exemplary architecture according to French patent number FR2893156 (B1) allying a general-purpose processor and several processing units specialized in intensive computations.

FIG. 1 illustrates, by a diagram, an exemplary MPSoC architecture according to French patent number FR2893156 (B1). This architecture allies a general-purpose processor SPU ("Standard Processing Unit") situated in a subset SPP of the architecture ("Standard Processing Part") and N processing units specialized in intensive computations APU0, APU2, ..., APUN−1 ("Auxiliary Processing Unit") situated in a subset APP of the architecture ("Auxiliary Processing Part"). Hereinafter, the APU0, APU2, ..., APUN−1 will be designated by "the APU processor(s)" or even "the APU(s)". The APU processors can communicate by way of a shared memory SMS ("Shared Memory Space"), this SMS memory moreover possibly having its own controller MSC ("Memory Space Controller"). Banks of registers SRF ("Shared Register Files") can also be shared by the APU processors. The SPP receives data by way of a System Bus SB and of a bus controller SBA ("System Bus Arbiter").

The two subsets SPP and APP have properties and functionalities that are radically different, but nevertheless participate in one and the same objective, namely the simultaneous execution of several tasks. In a general way, the SPP is responsible for executing the tasks. Task execution includes on the one hand the processing of the instructions constituting the program to be processed. For this purpose, the SPP comprises a control unit ESCU ("Extended Standard Control unit"), which is responsible for reading and for decoding the instructions. The SPP also comprises a storage unit comprising two first-level cache memories L1D-Cache and L1I-Cache, a second-level cache memory L2-Cache, as well as a loading unit LSU ("Load Store Unit"). On the other hand the task execution includes the system software. In contradistinction to a conventional processor, the SPP is capable of calling upon the auxiliary execution units, namely the APU processors, to process certain applicational portions requiring very large computational powers. The present invention concerns the manner of calling upon the auxiliary computation units, namely the APU processors.

Indeed, to implement mesoparallelism, blocks of instructions are assigned to the APU processors by an Allocation and Control Unit ACU situated in the APP. Their physical allocation to the APU processors, as well as the management of their execution and their synchronization, are the responsibility of the ACU. The APP can comprise a mass memory MM ("Main Memory"), so as to store all the data and programs manipulated by the APU processors. This memory MM moreover has its own controller MMC ("Main Memory Controller"), on which the ACU allocates blocks for transferring data between the system and the intensive-computation blocks. Thus, although strongly coupled, the subsets SPP and APP are capable, by virtue of the ACU, of operating in a desynchronized way. The ACU allows best management of the weakly synchronized use of the APUs, in such a way as to optimize, at the system software level, the use of parallelism, performance and consumption.

A principle underlying the invention is to start from customary sequential codes to which are appended a few indices left by the application programmer, so as to better separate the code parts of data "computation/processing" type (or "computation code" or "processing code") from the code parts of "control" type of an application (or "control code"). Indeed, two major types of executable code may be distinguished. Control code is characterized by a fairly low potential IPC, as there is great randomness of control which depends as much on the data produced and consulted as on the execution history. The predictability of the branchings and the predictability of the memory accesses are low. General-purpose processors are well suited to tasks of control type. Computation code is for its part characterized by a significant potential IPC, as there is little unpredictable randomness of control or memory access. Instruction parallelism is significant and easy to optimize, notably on specialized processors of DSP/SIMD type. Loop unrolling is useful for reducing the perceived randomness of control.

In order to separate the computation code parts from the control code parts, a first compilation phase is responsible for isolating the control code on the one hand, but while retaining all the necessary information about the data flows that have disappeared, and on the other hand for having the extracts of code and the functions of computation and data processing type. It then entails compiling, if this is not already done in libraries, the processing codes which have to execute on the auxiliary computation units, namely the APU processors. In a second compilation phase, the data flow graph is processed for the control code to be executed on the SPP. Next the allocation, loading and execution data for the APU processors are inserted into the control program, as are the data regarding synchronization between the APU processors. The first compilation phase may be illustrated with the aid of the following exemplary algorithm 1:

---
[algorithm 1] exemplary code sequence
---
```
spect_dat1= fft(dat1);
spect_dat2= fft(dat2);
my_det= det(spect_dat2)
if(Re(my_det)<Im(my_det))
   spect_dat_f2= mult(spec_dat2, i_value);
else
   spect_dat_f2= spect_dat2;
conv= mult(spect_dat1,spec_dat_f2);
ret= fft(conv);
```
---

The first phase corresponds to the extraction of the code to be positioned on the APU processors and of the associated data flow. The functions fft, det and mult are marked by the programmer for execution on the APU processors, the data dependency graph being analyzed. The second compilation phase may be illustrated with the aid of the following exemplary algorithm 2:

---
[algorithm 2] schematic control code obtained
---
```
(pseudo assembler + unchanged code)
Allocate computation processor APP#1
Allocate computation processor APP#2
load_prog fft on APP#2
load data dat2 for APP#2
run APP#2
load_prog fft on APP#1
load data dat1 for APP#1
run&free APP#1
Synchronize with APP#2
copy data spec_dat2
load_prog det on APP#2
run APP#2
Synchronize APP#2
load_prog mult on APP#2
if(Re(my_det)<Im(my_det))
{ load i_val on APP#2
    run APP#2
}
else
{ spect_dat_f2= spect_dat2;
}
Synchronize APP#1 and APP#2
load spect_dat1 on APP#2
run&free APP#2
Allocate processor APP#3
```

---
[algorithm 2] schematic control code obtained
---
```
load_prog fft on APP#3
Synchronize APP#2
load conv on APP#3
run&free APP#3
Synchronize APP#3
```
---

The second phase sets up the control code, on the basis of the dependency graph, of the potential parallelism and of its execution on the APPs. The pseudo-instructions which begin with an upper case letter are operations which require synchronization of the parallelism. They set up markers at the processor level so that the basic system software can know whether the task is or is not awaiting synchronization.

Thus, after compilation, the model seen by the SPP playing the role of control processor and by the basic system software is of ordinary sequential type, but with synchronization points in the form of assembler instructions which appear in the code. A typical sequence is given hereinafter as an example:
   a task under execution can be allocated an APU processor via an assembler instruction. The execution of this instruction may be disabling, for example if there is no longer any processor available in the APP for the application;
   subsequent to this a processor of the APP is allocated to the task until said processor has finished execution. It then implicitly returns to the list of processors available for other processing activities;
   the other disabling instruction for a task is the synchronization instruction. It is associated with a list of processors of the APP for which the end of execution is awaited.

On the SPP, the interrupts and exceptions are managed as on a standard processor. By default, they do not have any impact on the processors of the APP. The consequences for implementation are:
   for a non-fatal interrupt or exception of the "underflow" type, it is in general not necessary to force the shutdown of the APUs, which will thus be able to continue their computation even though the interrupt or the exception is processed, or indeed while the task undergoing execution is switched in favor of another. When the interrupted task is reactivated, the computations on the APUs will have advanced and the least possible time will have been lost;
   for an interrupt which leads to a rescheduling which brings forward a task which is forced to wait on APU standby by other less urgent ones which have been allocated APUs, it is also the responsibility of the basic system software to choose the shut down APU processor for reallocation to the more urgent task.

But it must be clearly understood that this describes only in a very simplified manner what may be the execution model implemented on the exemplary architecture of FIG. 1. It is nonetheless clear that, by virtue of the ACU, the SPP must be able to implement:
   the allocation of the APU processors to the task undergoing execution. For efficiency reasons, the deallocations will insofar as possible have to be implicit or at least semi-implicit;
   the management of the shared memory on chip. This memory is necessary for performance reasons in every MPSoC. This includes:

the allocation and the deallocation of memory to a particular APU processor;

the loading and the invalidation of memory with data or programs.

the running of processing activities on the APU processors.

Moreover, the ACU must also be able to manage in an autonomous manner, that is to say independently of the SPP or of any other hardware element, the crux of the APU processor deallocation procedures, of the procedures for terminating processing activities, as well as part of the management of the memory embedded on the chip.

Figure 2:
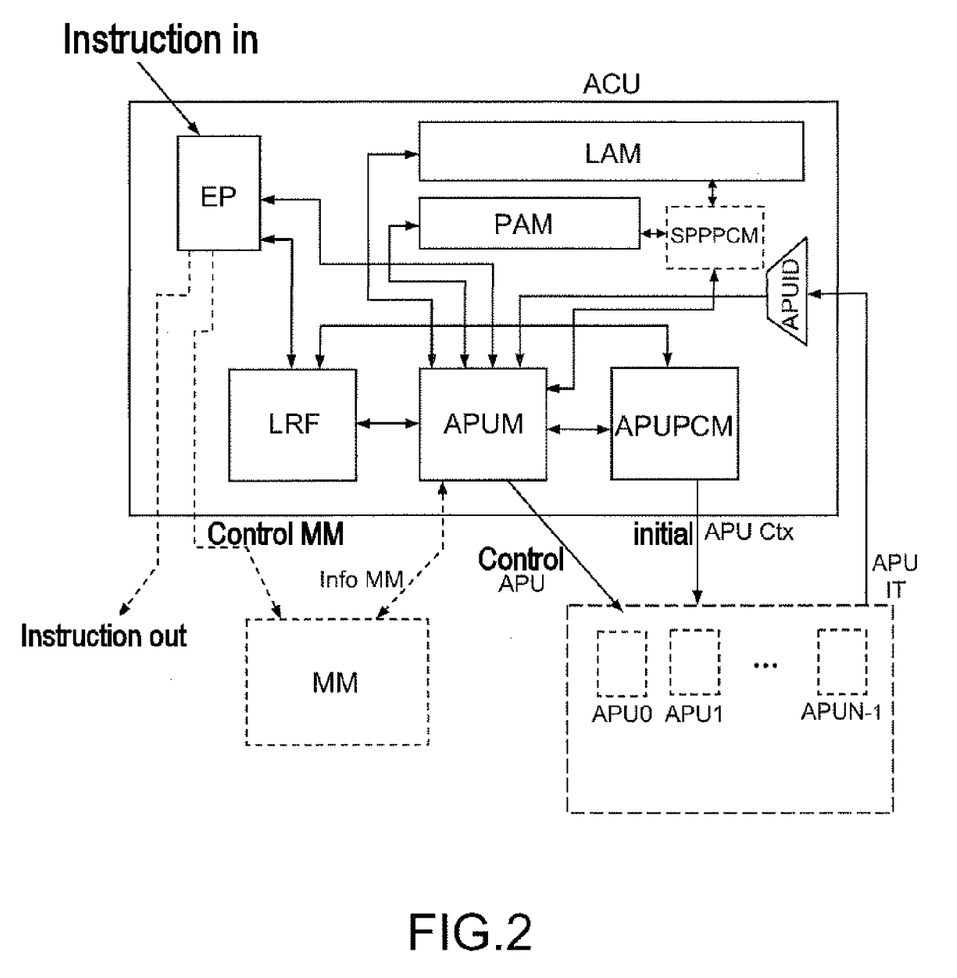
FIG. 2, by a diagram, an exemplary architecture of an allocation and control unit according to the invention.

FIG. 2 illustrates by a diagram an exemplary architecture according to the invention for the ACU of FIG. 1, responsible for accelerating the operations for managing the mesoparallelism on the APU0, APU2, . . . APUN−1. The internal connections are shown as solid lines whereas the external interfaces are shown as dashed lines. The ACU is also responsible for managing part of the weak synchronization, without involving the framework of explicit management by a dedicated kernel. This is possible when the operations to be carried out are one-to-one, when they are simple to implement in the hardware and when they are liable to appreciably improve the performance of the whole assembly. In essence, the ACU therefore has a very significant system dimension. An objective is to dispense with the particularities of the operating system, when there is one, and to render the system as efficient as possible. Of course, such a system provides an optimum level of performance only when a dedicated kernel makes it possible to profit from the dead times of the control processor in order to operate other tasks. Globally, the ACU offers a virtualization of the use of the APU processors, in such a way that the implementation of an execution model of weak synchronization type is simple and efficient, the compilation tools and the system software intervening only when this turns out to be necessary. The ACU serves to execute particular instructions for managing parallelism, which are inserted into the program which is undergoing execution on the SPP. The ACU also serves to manage the APUs and to manage the interface of the APUs with the SPP.

The Execution Pipeline (EP):

Advantageously, the ACU can comprise an Execution Pipeline EP, which is responsible for the execution of the instructions specific to the management of parallelism on the APUs or of the MM on the basis of the instructions inserted into the instruction flow of the SPP. It is a conventional execution unit, which may be implemented in various ways as an efficient pipeline or a microprogrammed sequencer. But in the present preferential embodiment, it is a pipeline.

The description which follows is given on a basis where the APU processors are homogeneous with unified management. The generalization to heterogeneous APU processors is simple: it suffices to separate the descriptors dedicated in respect of each type of APU. The impact at the level of the instructions of the execution pipeline is that it is necessary to add an APU type identifier at the allocation instruction level. Per APU type, there is then management of logical APUs by a logical APUs' manager LAM ("Logical APU Management") and management of physical APUs by a physical APUs' manager PAM ("Physical APU Management"). An APU manager APUM ("APU Manager") is then responsible for allocating the logical APUs to the context under execution, as well as for managing the correspondence between logical APUs and physical APUs.

The execution pipeline EP can advantageously make it possible to process the following basic instructions:

allocation of an APU processor: this entails associating a logical APU with the task undergoing execution on the SPP. The instruction returns a logical APU number, obtained by the APU manager APUM in a global register or a memory indexed by the instruction. The instruction can take additional parameters which may have to be compared with a bank of local registers LRF ("Local Register File"), which will be detailed subsequently, for example so as to limit the number of APUs allocatable in a particular section of the SPP code. Implementation is ensured by the APU manager APUM, as explained subsequently;

execution on an APU processor: this instruction requires a specific context, which may be provided either by a context identifier under the assumption of operating with elaborate contexts, or by a simple triplet (program identifier, data identifier at input, data identifier at output). This second case is a commonplace case of processing activities and allows generic processing: it is better to implement it in all cases. The first case allows greater flexibility in the definition of the processing activities, but requires particular instructions for generating context of APU processing activities on the SPP, thereby optionally requiring the addition of an internal link between the execution pipeline EP and an APU Partial Context Manager APUPCM which will be detailed subsequently. There are two possibilities of implementation for the execution instructions, and it is possible to implement one of the two or both by choice. The solution where both are implemented is a preferred implementation:

execution on an APU processor with freeing: a physical APU is allocated in respect of execution as soon as possible. The associated logical APU is freed as soon as the physical APU has terminated its execution, without requiring any synchronization;

execution on an APU processor with synchronization: a physical APU is allocated in respect of execution as soon as possible. The logical APU is not freed in respect of the context (but only in respect of this context of execution of the SPP) as long as a synchronization instruction is not encountered. On the other hand the logical APU may be reassigned in a different SPP context as soon as the physical APU has terminated its execution.

synchronization of execution of APU processors: this entails verifying that one or more logical APUs specified in the instruction have finished executing. The APU manager is directly responsible for the execution proper of this synchronization, which may cause an exception. Once the execution of the instruction has terminated, the logical APUs under synchronization request are all freed in respect of the current context. In a mode of preferential implementation, several APUs may be synchronized with the same instruction. A simple way of doing this is to use a logical APU mask to be synchronized. The information may be passed through one or more registers in one or more synchronization instructions, even if the case where a single instruction is necessary should be preferred. The information can also be passed through a structure in memory whose address is passed. Hereinafter, the term "synchronization mask" will refer to the set of logical APUs for which synchronization has been requested, even if this entails a particular case of implementation.

The execution pipeline EP can also make it possible to process the following instructions to facilitate the implementation of the system:

addition of a TLB ("Translation Lookaside Buffer") input or of a value of startup register associated with a logical APU for the management of the APU partial contexts;

definition of a correspondence address in memory for the logical APUs' synchronization and execution masks. This makes it possible to avoid involving the system software to manage the APU freeings in SPP task contexts that differ from that undergoing execution as detailed subsequently;

instructions for modifying local registers, in particular the optional local registers indicating the number of physical APUs allocatable in the context of the task, the mask for allocating logical APUs in the context of the task or else the interrupt and exception masks detailed subsequently. If appropriate, it is also necessary to modify the APUs' internal management tables, as detailed subsequently.

The Bank of Local Registers (LRF):

As regards the bank of local registers LRF, which is optional, it can comprise in a basic configuration the following registers:

an indicator of masking of the specific exceptions and interrupts of the ACU such as the allocation or synchronization exception;

an indicator of the physical APUs undergoing execution;

an indicator of the logical APUs undergoing execution in the context;

an indicator of the non-synchronized logical APUs in the current context. In addition to these basic registers, the bank of local registers LRF can also comprise diverse other registers, for controlling the number of APUs allocatable in a given context for example, including:

a maximum number of physical APUs allocatable in the current context;

a mask for allocating the logical APUs in the current context;

an address of the mask for synchronizing the logical APUs in the current context.

The bank of local registers LRF ensures part of the interface with the system software. In this respect, it can also comprise means for managing the energy on the chip, by providing for example low-consumption configurations for the APUs, probably with lesser performance, or indeed means for placing certain APUs on standby. The other part of the interface with the system software is effected by way of the APU manager APUM as detailed hereinafter.

The APU Manager (APUM):

To a certain extent, the APU manager APUM may be considered to be the core of the ACU. Its role is notably to allocate the logical APUs to the context under execution, to manage the correspondence between logical APUs and physical APUs, and also to accelerate certain operations customarily devolved to system software, or indeed to substitute itself for the intervention of the system software in certain cases. The APU manager APUM may be fairly simple, since it is mainly a reactive system. The chart below describes the processing activities that it carries out as a function of the signals that it receives from the execution pipeline EP.

| Input signal | Outputs | Action |
| --- | --- | --- |
| Allotting of a new logical APU | Management of logical APUs. Global registers of the SPP. If appropriate, the line of exception of the SPP. | Searches for a free logical APU and to the current context. Returns the number of the allocated or an exception if there are no longer free logical APUs. |
| Allotting of a new TLB input | Management of partial contexts | Add TLB input into the partial associated with the logical APU. |
| Execution of a processing on an APU | Physical APU management. If appropriate, the line of exception of the SPP. | Allots a physical APU from among physical APUs. Updates the mask of the non-synchronized APUs if necessary; if there are any free physical APUs, an exception generated. |
| Synchronization of execution | Local registers. If appropriate, the line of exception of the SPP | Comparison (logical OR) between of the APUs undergoing execution synchronized APUs. Generates an exception if APUs synchronization mask are still undergoing execution. |

The ACU can also comprise an interrupts decoder APUID ("APU IT Decoder") making it possible to reformat the interrupts arising from the APUs into a form which is simpler to process by the APU manager APUM. The chart below describes the processing activities that the APU manager APUM carries out as a function of the signals that it receives from the interrupts decoder APUID:

| Input signal | Outputs | Action |
| --- | --- | --- |
| End of execution of a physical APU | Local registers. If appropriate, the line of exception of the SPP. | The APU is no longer considered occupied and the associated indicators updated (except if there are processing activities on standby). Update of the synchronization execution is requested with synchronization (if the context has changed, maskable interrupt is raised, or an automatic update mechanism is used). |
| Execution error | Line of exception of the SPP (Dispatch/Completion/execution control) | An exception is uploaded to the SPP. The faulty APU number (the translation is performed) is to the exception manager (via standard exception mechanisms). |
| Timers (possible/optional extension) Debug | Line of exception of the SPP (Dispatch/Completion/execution control) | The aim here is to be able to overruns of execution time processing activities on the APUs, assistance with fine tuning. The mechanism is the same hereinabove. |

It should be noted that the APU manager APUM needs nothing more to operate the multiprocessor system of FIG. 1 in the weak synchronization execution model according to the invention. It should also be noted that the exceptions associated with the specialized instructions executed on the APU have an advantage in being masked by default. Indeed, the response of the ACU to such a masking is to wait for the situation associated with the exception to resolve itself. This makes it possible to implement the execution model without needing to adapt the system software. However, such an execution model markedly reduces the potential performance, since the exceptions are conceived and designed so that the SPP can optimize the utilizable parallelism by intelligently prompting the system software to carry out a switch of task as soon as the task undergoing execution is disabled in its execution, be this on account of problems with resources or of synchronization problems. It should also be noted that the APU manager APUM is based on the services of association between logical APUs and physical APUs and vice versa.

The APU manager APUM is the privileged interface with the system software. When the system software is adapted and the option of automatic management of the APUs is implemented as detailed subsequently, the intervention of the system software is limited to the strict minimum. It intervenes solely when it is advantageous to switch task at the system level so as to optimize the parallelism. At this level, the system software alone has the complete information to place the SPP in energy saving mode ("idle"), which could advantageously be coupled with energy management of the SPP itself. On the other hand, the APU manager APUM possesses all the information for the management of the APUs. By virtue of its advance knowledge of possible switchings of tasks, the APU manager APUM can even deal with placing the APUs on standby and then waking them up. Thus, when the queue of processing activities waiting for APUs is empty and there are APUs with no processing, they may be placed on standby, even though at least one will be woken up when the ACU dispatches an interrupt to the SPP or when a new instruction arising from the SPP is executed on the ACU, in particular the SPP change-of-partial-context instruction detailed subsequently. On the other hand, the frequency-wise adaptation, if it is implemented, has to be adapted to each processing. Said adaptation is therefore the responsibility of the user code and of the system software on the SPP and it requires particular local registers for storing the configurations of the APUs.

The APU Partial Context Manager (APUPCM):

The APU partial context manager, which is optional, contains only the startup context for the processing activities on APU0, APU2, ..., APUN−1. In the preferred implementation, it is not envisaged that it contains complete hardware contexts and, still less, extended contexts, since this would take up a great deal of room. A basic principle is to have tasks whose duration of execution is relatively small, of the order of a few tens of thousands of execution cycles, so that the necessity for partial preempting of the APUs does not actually exist. The counterpart of this assumption is that startup of the processing activities on the APUs must be very fast. However, the simplifications effected in this patent render this possible. It entails notably storing TLBs for access to the mass memory MM. The remainder of the context, in particular the registers, are not stored. Indeed, the processing activities on the APUs are preferably non-preemptable since they are in principle relatively short. If the APUs are optimized for simple startup and simple shutdown on well defined code boundaries, then it should be possible for their startup almost "from cold" on a new processing activity to be performed in a few cycles. The processing code may be generic, but then the logical processing addresses for the APUs are constant in the code, the physical addresses are given by the few TLB inputs of the partial context provided on startup. In this way, SPDM (Single Program Multiple Data) processing may be performed easily on the basis of the APUs, even within the framework of cascaded or pipelined processing activities.

The Physical APUs' Manager (PAM):

The management of the physical APUs essentially uses storage structures to associate an allocated physical APU with a processing on the SPP. In the present example, the management is organized as a double queue: one queue for the free physical APUs and another for the physical APUs undergoing processing. In another embodiment, a single and nonmutable data structure may be used for both. The physical APUs' management functionalities can then be implemented with the aid of priority encoders or associative memories. When the startup instruction is encountered in the flow of the program on the SPP, the logical APUs' manager searches to associate a physical APU with the logical APU for which the execution request in respect of a processing is made. The procedure is therefore simple: the management of the physical APUs is constituted as a queue of free physical APUs. Upon a run instruction at the level of the APU manager, the first element of the queue of free physical APUs is taken. According to the implementation, the processing activities not allotted to a physical APU may be placed in a pending queue. In this case, a buffer of pending processing activities can begin working, independently of the processing activities in progress on the SPP. It is simple to note that the pending queue of processing activities is limited to a maximum depth of NAPUlogical-NAPUphysical where NAPUlogical is the number of logical APUs offered and NAPUphysical is the number of physical APUs available in total. When a physical APU terminates its execution and the termination signal reaches the APU manager, the latter places the physical APU back into the list of free physical APUs. If a pending queue of processing activities that are pending is implemented, the phase of placing the APU back into the list of free APUs may be short-circuited, by removing the first processing pending in the list and by assigning it to the freed APU. In the case of the use of priority encoders, setting a data bit associated with the physical APU to 0 or to 1 suffices to mark it as occupied or free. The queue management then no longer exists, but the remainder of the implementation does not vary.

The management of the physical APUs leads to two sets°: the set of free physical APUs and the set of allotted physical APUs. Optionally, there may also be a pending queue for the processes on standby waiting for a physical APU. During the allocation process, the physical APUs get associated with a logical APU number. They can also get associated with a number in an optional table of contexts, this table being detailed subsequently. Finally, they can get associated with an optional validity bit, an APU having for example a validity indicator set to "true" (1) when it is allocated, to "false" (0) otherwise.

The services provided by the physical APUs' manager PAM can advantageously be the following°:
  allocation of a free physical APU and association with a logical APU number;
  provision on request of the logical APU number associated with a physical APU number, this being useful to the APU manager for freeing the logical APU when the signal of termination of processing on the physical APU is received by said manager;
  freeing of a physical APU;
  provision of an input in a table for context management associated with a physical APU;
  management of a queue of processing activities waiting for physical APUs.

The Logical APUs' Manager (LAM):

Like the management of physical APUs, the management of logical APUs essentially uses a storage structure. It should be noted that the management of logical APUs tends to give ground in part when the number of logical APUs approaches the number of physical APUs. When the APU manager APUM requests a logical APU, the logical APUs' manager LAM can return the first available free logical APU. If no logical APU is available, the logical APUs' manager LAM returns a signal to the APU manager APUM, which then emits an exception or waits for a logical APU to be freed, as explained previously. When a request for freeing of a logical APU is made by the logical APUs' manager LAM, the APU of the number transmitted is placed back into the set of free APUs. According to the implementation, management of partial contexts of the SPP may be implemented. This management may be linked up with the management of SPP contexts for the physical APUs as explained previously.

The organization of the data structures makes it possible to distinguish a set of free logical APUs and a set of allocated logical APUs. With each input is associated a physical APU number and a validity bit. The validity bit indicates whether the physical APU associated with the number is or is not actually associated with this logical APU. Optionally, an optional exception request bit may be used, as well as a field for an SPP context number. It is clearly apparent that there is information in common between the structure for describing the allocations of the physical APUs and that of the logical APUs. This makes it possible to choose various implementation pathways between 2 memory structures to be updated in parallel or a single associative-memory structure.

The services provided by the logical APUs' manager LAM can advantageously be the following:
  allocation of a logical APU number, for example the first element of the list of free logical APUs, but optionally an input for an SPP partial context descriptor may be associated;
  freeing of a logical APU;
  association of a logical APU with a physical APU number.

The Interrupts Decoder (APUID):

Advantageously, the interrupts arising from the APUs may be reformatted in a form which is simpler to process by the APU manager APUM. Certain interrupts, such as execution errors on an APU, are uploaded directly to the SPP's termination unit where they are processed as global exceptions of the SPP. The other signals to be reformatted for the APU manager APUM concern the ends of execution of the processing activities in progress on the APUs, as well as all the potentially interesting signals, such as for example the particular signals for the operations for fine tuning the programs on the APUs ("debug").

A role of the interrupts decoder APUID is to serialize the various signals of interest heading for the APU manager APUM. Once the signal has been relayed to the APU manager APUM, its role is also to provide the signals acknowledging the interrupts to the APUs which emitted them, doing so in tandem with the processing activities. Note that the implementation to be preferred comprises an events buffer, thereby making it possible to free the signaling line between the APU and the ACU as early as possible, and thus earliest possible allocation of the APUs freed for new work.

The SPP Partial Context Manager (SPPPCM):

The SPP partial context manager SPPPCM is optional, it makes it possible simply to free the logical APUs allocated with synchronization request in a transparent manner and as early as possible. This functionality is normally devolved to the system software, but in the present exemplary embodiment the ACU can act as a dedicated accelerator for relieving part of the work of the system software. This significantly decreases the context switching times and the processing times. Of course, even when it is implemented, this mechanism can be turned off by the system software. To activate this mechanism, the system software must supply the address of the context synchronization mask as explained previously, otherwise the mechanism is deactivated at base. Each time this address is updated by the system software, the address provided is compared with those already present in the SPP partial contexts table. If there is no corresponding entry, the manager SPPPCM preselects a free entry of this table. It is completely allocated only upon the allocation of a logical APU, the entry number then being supplied to the previously described table. The field for allocating the logical APUs is updated in this same table, the bit corresponding to the allocated logical APU being set to 1. When a physical APU is allocated, the field of the table of non-synchronized logical APUs is updated with the current value corresponding to the logical APU number associated with the allocated physical APU. Likewise, the field of the previously described table of physical APUs is supplied with the entry number in the SPP contexts table. When a physical APU is freed, the table's synchronization field is updated, as is the allocation field. The values are written to memory at the address provided. If the fields have returned to zero, the entry of the context table is freed. In all cases, the corresponding logical APU is freed, its use by another task having been correctly traced.

A significant advantage of the SPP partial context manager SPPPCM is that the logical APUs may be freed on the fly, even if the execution is multitask with APU independent uses within the various tasks. The logical APUs can therefore be made re-available to the current context without involving a switch in respect of the context which allocated the logical APU in question.

Moreover, a few interfaces may be useful to optimal operation of the APUs in conjunction with the ACU, such as for example:
  an interrupt and exception line APU IT may be connected to the interrupt decoder APUID. This line may be coupled to a bus or to a line for the transmission of ancillary information, such as for example an instruction pointer in case of execution error on an APU. The activation of this line by an APU then disables said APU until the ACU returns a signal acknowledging the exception. This line can in particular be responsible for signaling the ends of processing activities on an APU;
  a partial context loading unit, in particular for the TLBs, can advantageously be coupled to a reinitialization mechanism for resetting the other registers of use of the corresponding APU to zero, if this makes sense for the APU in question;
  units can manage the production/consumption of data, so as to coordinate the executions of various stages of software pipelines implemented by processing activities on the APUs. The producer then uses part of the shared mass memory MM to atomically write data production indicators. At least one consumer reinitializes the indicator in an atomic manner also. This functionality may readily be carried out in a software manner, but it may advantageously be implemented by a dedicated hardware accelerator. Thus, numerous processing activities can be chained together without requiring any synchronization by the ACU. By proceeding thus, the number of operations that must be carried out by the ACU may be significantly decreased, substantially improving the efficiency of parallel execution of the system. This mechanism is aimed at tracking down part of the mechanisms for managing the data dependencies, the other part being managed by the synchronization instructions. When the consumption management mechanisms are implemented, the line between the APU manager APUM and the APUs can also be used also to transmit the mode of operation of the APU.

Figure 3:
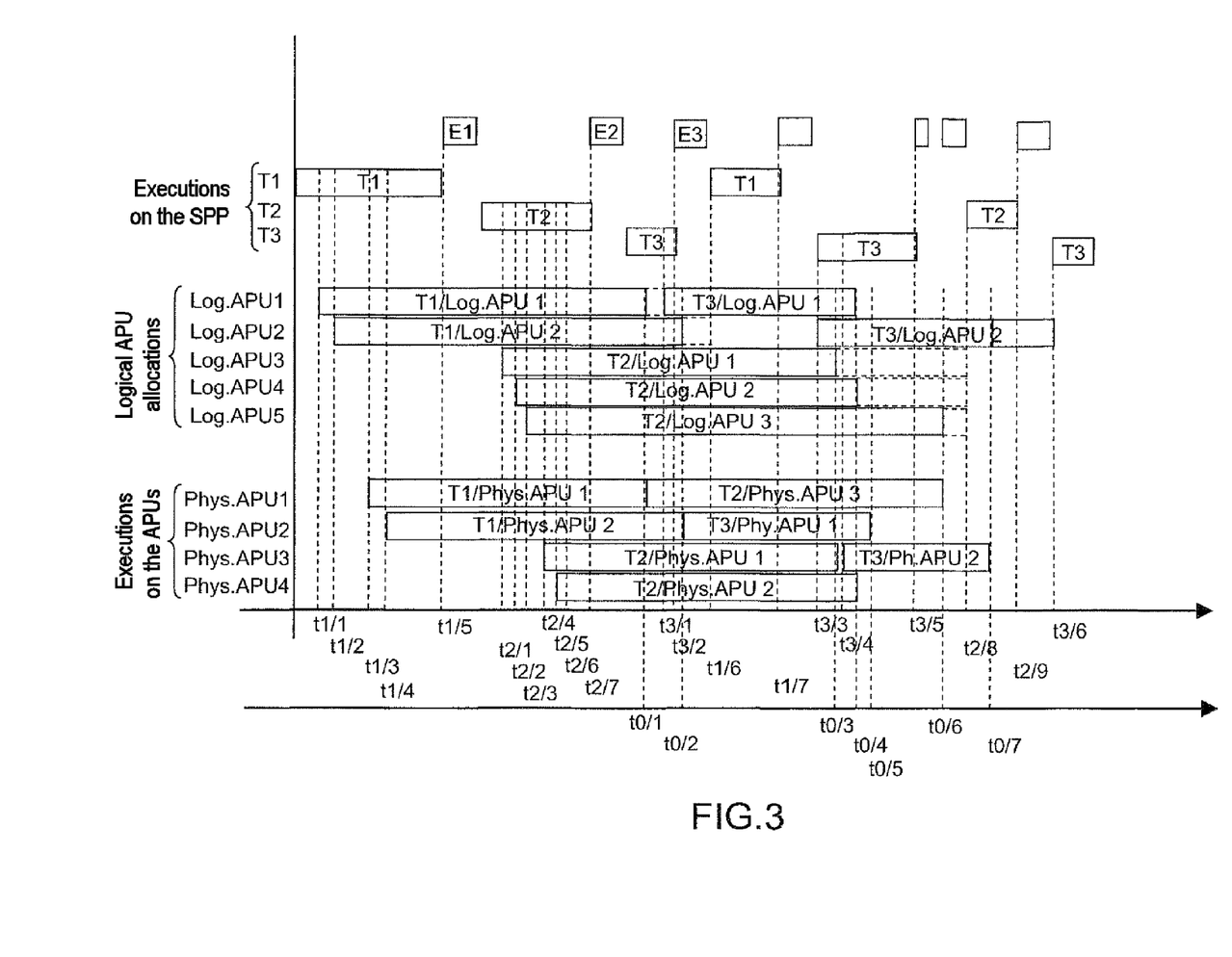
FIG. 3, by a timechart, an exemplary chaining of processing activities.

FIG. 3 illustrates by a timechart an exemplary chaining of processing activities on the architecture of FIGS. 1 and 2. This example is aimed more particularly at showing, on the one hand, the cooperation between the ACU and the basic system software and, on the other hand, the optimization of the utilization of the auxiliary processing resources, namely the APUs. This is an extract of an application composed of three active tasks:

- a task T1: allocation of two APUs, execution on the two APUs and then synchronization of the two APUs for the context;
- a task T2: allocation of three APUs, execution on the three APUs and then synchronization of the three APUs for the context;
- a task T3: allocation of an APU and then execution with implicit freeing, followed by the allocation of an APU and execution and then synchronization.

In order to illustrate a majority of behaviors, the assumption is made that only four physical APUs, APU1, APU2, APU3 and APU4, are available and that a queue of six logical APUs is usable.

At an instant t1/1, T1 allocates an APU and the logical number 1 (first number of the list of free logical APUs) is returned to T1.

At an instant t1/2, T1 allocates a new APU and the logical number 2 (first number of the list of free logical APUs) is returned to T1.

At an instant t1/3, T1 requests the execution of a processing on logical APU 1; physical APU 1 (first number of the list of free physical APUs) is reserved by the ACU.

At an instant t1/4, T1 requests the execution of a processing on logical APU 2; physical APU 2 (first number of the list of free physical APUs) is reserved by the ACU.

At an instant t1/5, T1 requests synchronization with the end of the processing activities of logical APUs 1 and 2; the corresponding physical APUs have not completed the processing activities, the execution mask being at 0x3, therefore the ACU generates an exception E1 named "synchronization requested but processing activities in progress". The system software senses this exception E1 and switches the task T1, it therefore swaps the task T2 to the foreground on the SPP in place of T1.

At an instant t2/1, T2 allocates a logical APU; the ACU allocates it logical APU 3 (first number of the list of free logical APUs).

At an instant t2/2, T2 again allocates a logical APU; this time logical APU 4 is assigned to it.

At an instant t2/3, T2 again allocates a logical APU; logical APU 5 is assigned to the task T2.

At an instant t2/4, T2 requests the execution of a processing on logical APU 3 (the first allocated by T2); the ACU allocates physical APU 3 (first free physical APU) and requests the start of execution.

At an instant t2/5, T2 requests the execution of a processing on logical APU 4 (second allocated by T2); the ACU allocates physical APU 4 (first free physical APU) and requests the start of execution.

At an instant t2/6, T2 requests the execution of a processing on logical APU 5 (third allocated by T2); there are no longer any free physical APUs (list empty), therefore the ACU places logical APU 5 in the queue of logical APUs waiting for a physical APU for execution.

At an instant t2/7, T2 requests the synchronization with the set of three allocated logical APUs, the synchronization mask being at 0x1c; none of the physical APUs has finished executing, one of the logical APUs not even being allocated on a physical APU; an exception E2 named "synchronization requested but processing activities in progress" is processed by the basic system software, which thereafter hands over to the task T3, the execution markers for the task T1 showing it still awaiting synchronization.

At an instant t0/1, the physical APU 1 finishes its processing; the ACU updates the execution status in respect of task T1, the execution mask for the logical APUs in respect of T1 going from 0x3 to 0x2; as the list of logical APUs awaiting physical APU is not empty, the ACU associates physical APU 1 with logical APU 5 for T2, its execution mask remaining unchanged at 0x1c; the list of free logical APUs contains logical APU 1, since it has been freed for T1, even though the synchronization instruction has not yet been executed.

At an instant t3/1, T3 allocates a logical APU; it is logical APU 1 which is allotted to it (the only one which was free); next, T3 requests the execution of the processing on logical APU 1 with implicit freeing after processing; as there is no free physical APU, the ACU places logical APU 1 in the waiting queue of logical APUs awaiting a physical APU.

At an instant t3/2, T3 attempts to allocate a new logical APU, but there is no longer any available logical APU; an exception E3 named "no more logical APUs available" is raised, it is processed by the system software; T3 is pending waiting to be switched.

At an instant t0/2, the physical APU 2 finishes its processing; logical APU 2 associated therewith is freed at the execution level for T1 and the synchronization mask remaining for T1 goes from 0x2 to 0x0; T1, which had been switched on account of synchronization, may be synchronized; the system software can therefore switch the execution which was suspended for T3 to T1.

At an instant t1/6, the synchronization instruction for T1 is executed at the task switching return; as the two logical APUs had been freed in respect of task T1, the synchronization instruction is executed without causing an exception, this is the reason why the system software had switched to T1; formally, this is the moment in the execution of T1 at which the user program on the SPP is certain to have freed the two logical APUs.

At an instant t1/7, T1 frees the SPP, at least for a certain time of use of the computation results; the system software resumes control and places T3, which had been switched through lack of an available logical APU, back in the foreground.

At an instant t3/3, T3 executes the instruction for allocating a logical APU; this time, logical APU 2 is free, it is therefore allocated to T3.

At an instant t0/3, it is the end of the execution on physical APU 3; the associated logical APU, here logical APU 3 associated with T2, is freed by the APU; the synchronization mask for T2 goes from 0x1c to 0x18.

At an instant t3/4, T3 requests execution on logical APU 2 that it had allocated; the local execution mask is therefore 0x3; physical APU 3, which is free, is associated with logical APU 2 in respect of T3.

At an instant t0/4, it is the end of the execution on physical APU 4 associated with logical APU 4 in respect of T2; the ACU places physical APU 4 in the list of free physical APUs and logical APU 4 in the list of free logical APUs; the execution mask for T2 is therefore set to 0x10, likewise for the residual synchronization mask.

At an instant t0/5, it is the end of execution on physical APU 2 associated with logical APU 1 in respect of T3; the execution mask goes from 0x3 to 0x2 in respect of T3 and the APU is completely freed in respect of T3.

At an instant t3/5, T3 requests a synchronization on logical APU 2, which is allocated on physical APU 3; as the physical APU has not finished its execution, an exception is raised in respect of synchronization, the synchronization mask being set to 0x2; the basic system software takes control, but no allocatable task remains which is not disabled; the system software permits the interrupt take-up on end of APU execution and passes to energy economy mode on the SPP.

At an instant t0/6, it is the end of execution for physical APU 3 associated with logical APU 5 in respect of T2; the execution mask for T2 passes to 0x0, as does the synchronization mask; task T2 becomes executable again on the SPP; the end-of-execution interrupt not being masked at the SPP level, the system software resumes control on the energy economy mode, again masks the interrupts of end of APU execution and notes that the end of execution allows T2 to be executed; it therefore switches execution for T2 onto the SPP.

At an instant t2/8, T2 resumes its execution on the synchronization instruction, which does not cause any exception since the synchronization mask is set to 0; it continues its execution until the moment at which it hands over control to the system at an instant t2/9.

At an instant t0/7, it is the end of execution of physical APU 3 associated with logical APU 2 allocated for T3; the execution mask for T3 goes to 0x0, as does the synchronization mask; task T3 is again executable.

At an instant t2/9, it is the end of T2, which hands back control to the system software; the latter switches to T3 since it has again become executable.

At an instant t3/6, a synchronization instruction arrives in respect of T3; it does not cause any exception since the synchronization mask is set to 0; T3 finishes its execution.

This exemplary chaining of processing activities shows how the present invention allows excellent occupancy of the ancillary processing resources, namely the physical APUs, APU1, APU2, APU3 and APU4. This is due notably to the fairly high degree of abstraction conferred by the logical APUs. Moreover, the system software turns out to be very efficient, since it takes control on the execution of the tasks on the SPP only when it is not possible to do anything other than switch task or pass to economy mode.

The main advantages of the present invention are furthermore that it uses an ordinary processor to manage the medium-grained parallelism, this parallelism being, at the data dependency level, in accordance with what was computed by the compiler of the application.

In a single-task framework, the optimal use of medium-grained parallelism may be achieved through the automatic management of the auxiliary processing elements, by virtue of the processing of a very limited number of simple specific instructions introduced on compilation of the task. Outside of these instructions, the remainder of the management of parallelism is automatic. The present invention proposes a high-level interface which renders the use of the processing units abstract, this interface allowing the latest possible allocation and the earliest possible freeing of the auxiliary processing units, the correspondence with the real units being wholly the responsibility of the present invention. However, the system software may be accorded the right to modify this, by virtue of access to the internal registers of the present invention in particular cases where the compilation and the static analysis of execution in respect of a task has not sufficed to ensure execution which definitely satisfies the criteria imposed in respect of the task. The system software then has control to take dynamic decisions which may, in certain cases, turn out to be more efficient.

Within a multitask framework, the present invention offers the mechanisms required for the activation of the system software, so as to operate a switching of tasks as soon as the task undergoing execution is disabled in its management of the medium-grained parallelism. The invention also offers the mechanisms required for automatic updating of the task disabling indicators as soon as these disablings are lifted, doing so without requiring the intervention of the system software, so as to improve the implementation of the two levels of parallelism, coarse-grained and medium-grained. The invention also offers the mechanisms required by the system software for easily choosing which tasks are the activatable ones. The invention also offers, in part at the single-task level (user code) and in part at the multitask level (system software), the mechanisms required for managing the number of processing units used at a given instant. Thus, the global system is better able to keep to timescales relating to the processing activities, despite sharing the processing units between several tasks undergoing execution. Finally, the invention offers the mechanisms required for managing advanced aspects of energy economy, by facilitating the placing in economic mode both of the auxiliary processing units and of the main processor which integrates the present invention.

Generally, a system according to the invention makes it possible to execute instructions which are specialized in managing parallelism in heterogeneous multi-core systems. Once the parallelism management instructions have been given, the management of parallelism on the multicore architecture becomes automatic and needs no assistance in a single task execution framework on the processor which integrates the invention. Within the multitask framework notably, the invention becomes at one and the same time an assistant and an accelerator specific to the management of medium-grained parallelism for the system software present on the processor which integrates the invention.

Thus, during the execution of a task, the invention described above affords the greatest possible autonomy in the management of the auxiliary processing units, doing so without the system software having to intervene in respect of the execution of the task. Indeed, the system software intervenes only in the cases where there are no other alternatives, such as cases of error or cases where it is necessary to wait for synchronization. On the contrary, if a task is disabled, the invention described above permits the implementation of the system software for task switching, so as to optimize the use of the various parallelisms. Thus, the invention described above confers global determinism of execution which comes close to that conferred by a conventional Von Neumann architecture.

The invention claimed is:

1. A processor comprising a main processing unit, a plurality of auxiliary processing units, and an allocation and control unit for allocating execution threads for a task to the plurality of auxiliary processing units, wherein the task is associated with an executable code having a predetermined data dependency graph, said executable code being previously separated, at compilation time, into processing code to be executed on the auxiliary processing units and control code to be executed by the main processing unit, said control code comprising instructions for execution on the auxiliary processing units based on the data dependency graph, the control code of the task being executed in a sequential manner by the main processing unit, wherein each auxiliary processing units corresponds to one of a plurality of physical auxiliary processing units, and each physical auxiliary processing units being associated with one or more of logical auxiliary processing units, wherein the allocation and control unit controls parallel execution of said execution threads by said physical auxiliary processing units via the logical auxiliary processing units, the allocation and control unit comprising:

an auxiliary processing units manager for managing the plurality of auxiliary processing units, said auxiliary processing units manager being configured to allocate one or more of the logical auxiliary processing units to an execution context identifying an execution thread to be executed from said instructions and to associate each of the plurality of physical auxiliary processing units with said one or more of the logical auxiliary processing units in response to a request for execution of said execution thread on said one or more of the logical auxiliary processing units such that the associated physical auxiliary processing units executes said execution thread for the task, said auxiliary processing units manager being further configured to free said one or more of the logical auxiliary processing units for said execution context as early as possible in response a freeing request and completion of the execution of the execution thread by said associated physical auxiliary processing units based on the instructions in the control code, and allocate said one or more of the logical auxiliary processing units as late as possible by freeing said one or more of the logical auxiliary processing units in response to a synchronization request and completion of the execution of the execution thread by all of the logical auxiliary processing units specified in said execution context.

2. The unit according to claim 1, wherein said execution context comprises data for identifying the execution thread to be executed, input data for executing the execution thread, and output data.

3. The unit according to claim 1, wherein said auxiliary processing units manager is configured to:
   free, if the request for execution of the execution thread comprises a freeing request, said one or more of the logical auxiliary processing units in response to the execution of said execution thread by the one or more of the physical auxiliary processing units, and
   free, if the request for execution of the execution thread comprises a synchronization request and said instructions comprise synchronization data identifying a set of logical auxiliary processing units including said one or more of the logical auxiliary processing units, said one or more of the logical auxiliary processing units in response to the completion of the execution by all of the logical auxiliary processing units specified in the synchronization data.

4. The unit according to claim 2, wherein said instructions are implemented in the form of an execution pipeline or of a microprogrammed sequencer.

5. The unit according to claim 1, wherein said auxiliary processing units manager comprises a manager for managing the logical auxiliary processing units, said manager for managing the logical auxiliary processing units being configured to:
   provide a free logical auxiliary processing unit identifier;
   free a logical auxiliary processing unit; or
   associate the one or more of the logical auxiliary processing units with one or more of the plurality of physical auxiliary processing units.

6. The unit according to claim 5, wherein said manager for managing the logical auxiliary processing units is further configured to select an identifier of a first element of a list of free logical auxiliary processing units to provide the free logical auxiliary processing unit identifier.

7. The unit according to claim 1, wherein said auxiliary processing units manager comprises a manager for managing the plurality of physical auxiliary processing units, said manager for managing the plurality of physical auxiliary processing units being configured to:
   provide a free physical auxiliary processing unit identifier;
   associate the one or more of the physical auxiliary processing units with the one or more of the logical auxiliary processing units;
   provide an identifier of the one or more of the logical auxiliary processing units associated with each of the plurality of physical auxiliary processing units; or
   free one or more of the plurality of physical auxiliary processing units.

8. The unit according to claim 6, wherein said auxiliary processing units manager is configured to allocate the one or more of the logical auxiliary processing units to the execution thread to be executed by:
   searching for a free logical auxiliary processing unit;
   allocating the free logical auxiliary processing unit to the execution thread; or
   providing an identifier of the free logical auxiliary processing unit allocated to the execution thread.

9. The unit according to claim 1, further comprising a manager for managing execution contexts on said one or more of the logical auxiliary processing units.

10. The unit according to claim 1, further comprising an interruption decoder for decoding interrupts coming from the plurality of auxiliary processing units.

11. The unit according to claim 1, further comprising a manager for managing execution contexts on the main processing unit.

12. The unit according to claim 1, further comprising a bank of local registers including:
   a register for masking exceptions interrupts from the plurality of auxiliary processing units;
   a register indicating the plurality of physical auxiliary processing units undergoing execution;
   a register indicating said one or more of the logical auxiliary processing units undergoing execution; or
   a register indicating said one or more of the logical auxiliary processing units that have not formed the subject of a synchronization request by the task.

* * * * *